Nov. 23, 1954
P. CUSANO
2,695,174
SHUFFLEBOARD WEIGHT WITH PLASTIC COVER
Filed April 19, 1950
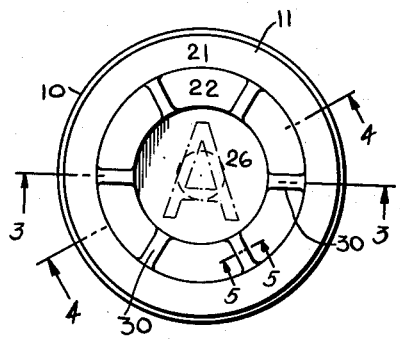
Fig-1-
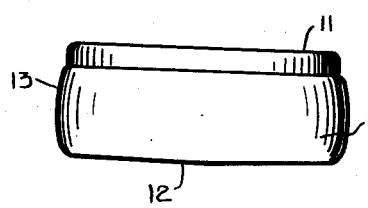
Fig-2-
Fig-5-
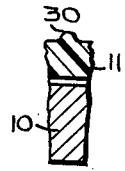
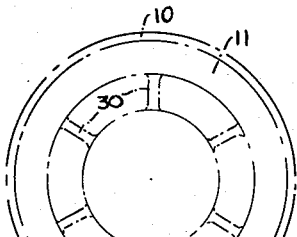
Fig-3-
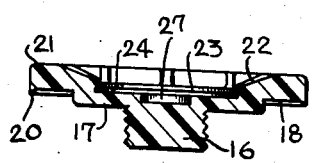
Fig-4-
INVENTOR.
PAUL CUSANO
BY
Luther W Hawley
ATTORNEY

United States Patent Office 2,695,174
Patented Nov. 23, 1954

2,695,174

SHUFFLEBOARD WEIGHT WITH PLASTIC COVER

Paul Cusano, Hasbrouck Heights, N. J.

Application April 19, 1950, Serial No. 156,914

4 Claims. (Cl. 273—128)

This invention relates to shuffleboard weights with plastic covers.

In playing shuffleboard, eight weights are used, four of the weights being identified by one color and one letter, such as A, and the other four being of another color and identified by another letter, such as B.

It is important that the identifying color and letter be visible from a distance and at different eye levels and also that the marks of identification be so positioned or located that they will not be marred or disfigured when one weight strikes another.

This invention has for its salient object to provide a shuffleboard weight so constructed that the identifying color will be clearly visible from a distance and at different eye levels and, moreover, having an identifying mark or indicia clearly visible and protected from contact by parts of other weights.

Another object of the invention is to provide a shuffleboard weight having color identifying portions so constructed and arranged that those portions will not be struck by a sliding weight and, moreover, so constructed that the colored portion can be easily removed and replaced.

Another object of the invention is to provide a shuffleboard weight having a steel body portion and a plastic identifying portion, the plastic portion projecting above the body portion but being so constructed and mounted or set back that it will not be engaged by another sliding weight.

Another object of the invention is to provide a shuffleboard weight having a steel body portion and a plastic identifying portion, the plastic portion projecting above the body portion but being so constructed and mounted or set back that the outer edge of the plastic portion will make a tight contact with the upper surface of the body portion so that no gap will be left therebetween.

Another object of the invention is to provide a shuffleboard weight having a steel body portion and a plastic identifying portion, the plastic portion projecting above the body portion but being so constructed and mounted or set back that the plastic portion will be firmly and securely cemented to the metal body portion.

Further objects of the invention will appear from the following specification taken in connection with the drawings which form a part of this application, and in which Fig. 1 is a top plan view of a shuffleboard weight constructed in accordance with the invention;

Fig. 2 is an elevational view of the weight shown in Fig. 1;

Fig. 3 is a transverse sectional elevation of a shuffleboard weight, this view being taken substantially on line 3—3 of Fig. 1, looking in the direction of the arrows;

Fig. 4 is a sectional elevation of the plastic insert or head, taken substantially on line 4—4 of Fig. 1, looking in the direction of the arrows; and Fig. 5 is a sectional elevation taken substantially on line 5—5 of Fig. 1, looking in the direction of the arrows.

In the embodiment of the invention shown in the drawings, the weight comprises a body member 10 and a head or cover member 11.

The body member is formed of steel and in contour and weight conforms substantially to the standard steel shuffleboard weight. The bottom 12 of the weight is slightly convex and the side wall 13 is slightly curved, as shown.

The top of the body portion 10 is recessed and has a central threaded recess or bore 14 and a recess 15 extending outwardly from the bore 14.

The top of the weight is covered by the head 11 having a central downwardly extending, threaded plug 16, which screws into the bore 14. A downwardly extending portion 17 of the head fits in the recess 15 and the under surface 18 of the head fits on the outer edge portion of the upper surface of the body portion 10, but the periphery of the head does not extend to the outer top edge of the body portion 10.

As shown in Fig. 4, the head, before being screwed into and secured to the body portion 10 of the weight, has a slight, downwardly extending lip 20 at its outer edge. This lip fits tightly against the top of the body portion 10 and is compressed thereagainst, thus preventing dust or dirt from collecting in a gap at the peripheral junction of the head and weight.

The head 11 has a flat, outer top surface 21, a downwardly inclined surface 22, and a central downwardly extending recess 23 which is undercut at the bottom, as shown at 24. An identifying disk 26 is pushed into the recess 23 and snaps into the undercut portion 24. At the center of the recess 23 is another, smaller recess 27. This is provided to receive the point of a sharp tool or pin which can be pushed through the disk 26 to permit removal and replacement of the disk.

The recess 23 in the head 11 is relatively shallow and in order to prevent the disk 26 from being contacted by and injured by the periphery of another weight in the manner shown by dotted lines in Fig. 3, the surface 22 of the head 11 is provided with a plurality of upwardly extending projections or nibs 30. These nibs are spaced apart, radially, around the surface 22, and the distance therebetween is small enough to prevent the periphery of a weight from being disposed between two nibs. The nibs, as shown in Fig. 3, effectively prevent the periphery of a weight from contacting the disk 26 of another weight.

To secure the head 11 to the body portion 10 of the weight, a suitable adhesive is used on the screw plug 16, between the under surface of portion 17 and the surface therebelow, between the periphery of portion 17 and the outer wall of recess 15, and between the surface 18 of the head and the top surface of the body portion 10. Thus the head 11 is securely affixed to the body portion 10.

Since the recess 23 in the head 11 is shallow and the disk 26 is relatively large, the disk is readily visible and can be seen from greater distance than in the usual shuffleboard weights and also can be readily seen from different eye levels.

Moreover, the highly attractive and colorful plastic head is clearly visible at great distances and its distinctive color readily identifies the weight. This promotes a faster game.

Because of its novel contour and mounting, the head is protected from engagement by the walls of other sliding weights since the body portion 10 bulges at its periphery beyond the periphery of the head. Also, the cap periphery does not extend to the top outer edge of the body portion 10.

Another important advantage attained by the construction shown and described is the added height of the weight, which makes it easier to grasp and provides a better grip for the player.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A shuffleboard weight comprising a body portion of steel and a head portion of plastic material secured to the top of the body portion and terminating at its marginal edge inwardly of and in proximity to the marginal edge of the body, the body portion having a central threaded recess extending downwardly from its upper surface and the plastic head portion having a threaded stud extending downwardly from the under side of the head portion and threaded into said recess.

2. A shuffleboard weight comprising a metal body portion and a head portion of plastic material secured to and extending above the upper surface of the body portion, said head portion having a recess extending downwardly from its upper surface, an identifying disk secured in said recess, and upwardly projecting nibs on the upper surface of the head surrounding said recess, said nibs being spaced apart a less distance than the height of the body portion of the weight and being of sufficient height to prevent the periphery of another weight from engaging the disk at the bottom of the head recess.

3. A shuffleboard weight comprising a steel disk-like body portion which is flat on top defining an annular ledge substantially parallel to the base of said body and having a downwardly extending central recess of reduced diameter, a plastic cover for the top of the body portion having a downwardly extending central plug secured in said recess and having a wide annular lip provided with a substantially flat under surface extending laterally from said central plug and substantially covering and engaging the flat ledge portion of the body portion top surrounding said central recess, said lip being thin relative to the thickness of the body portion.

4. A shuffleboard weight comprising a steel disk-like body portion which is flat on top defining an annular ledge substantially parallel to the base of said body and having a downwardly extending central recess of reduced diameter, a plastic cover for the top of the body portion having a downwardly extending central plug secured in said recess and having a wide annular lip provided with a substantially flat under surface extending laterally from said central plug and substantially covering and engaging the flat ledge portion of the body portion top surrounding said central recess, said lip being thin relative to the thickness of the body portion and extending substantially to the outer edge of the top of the body portion.

References Cited in the file of this patent

UNITED STATES PATENTS

| Number | Name | Date |
| --- | --- | --- |
| 336,062 | Palmer | Feb. 9, 1886 |
| 1,515,606 | Miller | Nov. 18, 1924 |
| 1,642,286 | Wuerthele | Sept. 13, 1927 |
| 2,128,095 | Levy | Aug. 23, 1938 |
| 2,321,524 | Schafer | June 8, 1943 |
| 2,414,672 | Sauer | Jan. 21, 1947 |
| 2,425,966 | Tjomsland | Aug. 19, 1947 |